(12) United States Patent
Hatabu

(10) Patent No.: US 6,377,626 B1
(45) Date of Patent: Apr. 23, 2002

(54) MOTION DATA PREPARATION SYSTEM

(75) Inventor: Yasunori Hatabu, Fukui (JP)

(73) Assignee: Artwings Co., Ltd., Miyazaki (JP)

( * ) Notice: Subject to any disclaimer, the term of this patent is extended or adjusted under 35 U.S.C. 154(b) by 0 days.

(21) Appl. No.: 09/118,021

(22) Filed: Jul. 17, 1998

(30) Foreign Application Priority Data

Jul. 18, 1997 (JP) .............................................. 9-226959

(51) Int. Cl.⁷ ................................................ H04B 1/66
(52) U.S. Cl. ................................................. 375/240.1
(58) Field of Search .......................... 348/416.1, 417.1, 348/699, 700, 701; 382/165, 155, 156, 157, 158, 159; 364/167.6; 345/7; 704/270, 271; 375/240, 240.01, 240.02, 240.09, 240.1, 240.11, 240.12, 240.13; H04B 1/66

(56) References Cited

U.S. PATENT DOCUMENTS

| | | | |
|---|---|---|---|
| 4,991,223 A | | 2/1991 | Bradley |
| 5,459,793 A | | 10/1995 | Naoi et al. |
| 6,079,862 A | * | 6/2000 | Kawashima et al. ..... 364/167.6 |
| 6,243,054 B1 | * | 6/2001 | Deluca .......................... 345/7 |
| 6,272,466 B1 | * | 8/2001 | Harada et al. ............... 704/270 |

FOREIGN PATENT DOCUMENTS

| | | | |
|---|---|---|---|
| JP | 04093704 | 3/1992 | ........... G01B/11/00 |
| JP | 06050983 | 2/1994 | ........... G01P/13/00 |
| WO | WO 90/15509 | 12/1990 | |

OTHER PUBLICATIONS

N.A. Borghese, et al., "An Algorithm for 3–D Automatic Movement Detection by Means of Standard TV Cameras," *IEEE Transactions on Biomedical Engineering*, Dec. 1, 1990, pp. 1221–1225, vol. 37, No. 12,, New York: IEEE Inc.

* cited by examiner

*Primary Examiner*—Chris Kelley
*Assistant Examiner*—Tung Vo
(74) *Attorney, Agent, or Firm*—Snider & Associates; Ronald R. Snider

(57) ABSTRACT

The motion data preparation system provides a motion data preparation system which can acquire stable motion data by detecting color markers without being affected by the surrounding brightness, and which is enabled to execute high-speed, accurate processing by reducing the amount of information on color image data. Color representations of about 16770 thousands of colors for a 24-bit input image are integrated and divided for each color camera, and outputted as 256 kinds of color group signals by look-up table memory circuits 125, 126. Thus, the amount of information is consolidated to about 1/60000, allowing a simple, fast calculation to be realized. Further, the color representation is, separated into luminance (Y) and chroma, for example, red color difference (R-Y) and blue color difference (B-Y), and the chromatic component is corrected by luminance. As a result, errors due to effects of variations in illumination conditions and the like can be reduced.

9 Claims, 13 Drawing Sheets

FIG. 8

|  | DATA A 0-15 | DATA A 16-31 |  |
|---|---|---|---|
| DATA B 0-15 | $DR_{11}$ | $DR_{12}$ | ---------- |
| DATA B 16-31 | $DR_{21}$ | $DR_{22}$ | ---------- |
|  | ⋮ | ⋮ | ⋮ |

160

MOTION DATA PREPARATION SYSTEM

BACKGROUND OF THE INVENTION

This application claims the priority of Japanese Patent Application No. H9-226959 filed on Jul. 18, 1997, which is incorporated herein by reference.

The present invention relates to a motion data preparation system (so-called motion capture system) for detecting a motion locus of a color marker formed on a subject and preparing motion data of the subject based on the detection information.

In recent years, in the field of the movies using animation and the virtual reality, or the movies using computer graphics (CG), techniques for realizing more real motions of animation by inputting actual man's motion data to synthesized animation characters have been becoming widespread. In this case, the so-called motion capture system in which motions performed by a man equipped with many sensors from head to foot are captured by camera and motion data are prepared by analyzing the captured motions of the sensors on a dynamic image is used. Applying such data to characters prepared by CG or the like makes it possible to represent, with real motions, even a scene that, for example, an actually non-existing monster and men grapple with each other.

Data input in such a motion capture system is implemented by, for example, a process of three-dimensionally measuring spatial positions and twist directions with a mounted magnetic sensor. More specifically, while a receivers (sensor) containing an orthogonal coil is attached to a moving body, an AC current is passed through an orthogonal coil set on the transmitter, where in a magnetic field thereby generated, the body is put into motion. Then, an induced current occurs to the receiver, so that data such as positions and angles of two-dimensional or three-dimensional coordinates by measuring the induced current.

Further, as another method, there is a technique in which a reflecting type target (marker) mounted to a moving body, the moving body is photographed by a plurality of cameras so that the motions of the marker are captured as an image. This technique may be exercised in a method that positional coordinates on the screen are obtained by using as the marker a light-emitting diode that blinks in synchronization with an image signal, or in another method that with the use of a marker that emits light by a special illumination, positional coordinates of the light-emitting body are obtained by image analysis. However, the former method has problems that the motion of the body is limited by the signal cable connecting to the light-emitting diode or that it is difficult to apply this method to small, lightweight bodies. The latter method, on the other hand, is unable to discriminate a plurality of markers from one another, so that additional input operations to a computer would be required, as a disadvantage.

Thus, in order to solve these and other problems, there has been proposed a motion capture system having a constitution that with individual targets attached to a body in the form of color marks, these targets are shot by a video camera while information signals as to color and configuration of the markers are extracted to a video board, where for example centroidal positions are determined based on the extracted information signals, thus allowing two-dimensional or three-dimensional motions of the measurement-object site to be known (see, for example, Japanese Patent Laid-Open Publications H4-93704 and H6-50983).

For image analysis using computers an analysis method using the three elements of red (R), green (G) and blue (B) that are the three primary colors, where their intensities are utilized, is in common use. This method, however, has a difficulty in analysis because the color is represented in three-dimensional space, as well as a problem that errors in data extraction accuracy may occur under influences of changes in illumination because luminance is included as a factor. Further, in a motion capture system that handles color images, because the amount of information on color image data is incommensurably larger than that of gray scale images, memory of quite high capacity and CPU of high speed would be required so that the system would result in increased scale and higher price. Thus, it problematic to introduce this motion capture system. In particular, in an attempt to introduce a monitoring system that uses a plurality of monitor cameras for color images, the required amount of memory would be enormous so that the system's problems of complexity and high price would be more noticeable, resulting in a bottleneck for widespread use of the system.

An object of the present invention is therefore to provide a motion data preparation system which is enabled, for recognition of color markers provided on a subject body by shooting the color markers with color cameras, to detect the color markers without being affected by the surrounding brightness and thereby acquire stable motion data, and which can execute high-speed, accurate processing by reducing the amount of information on color image data.

SUMMARY OF THE INVENTION

In order to achieve the above object, in a first aspect of the present invention, there is provided a motion data preparation system comprising:

one or a plurality of color cameras for shooting motions of a subject in a state that color markers are attached to the subject or that part of the subject is determined as a color marker;

color-integrated image data generating means for, through a decoding process of color image signals based on image outputs from the color cameras, integrating and consolidating color information included in each of the image signals into a specific number of color groups, and thereby generating image data (hereinafter, referred to as color-integrated image data) having data pieces smaller in number than the color image signals;

marker specified-color extracting means for extracting data of pixels having a color previously specified as a color of the color marker (hereinafter, referred to as marker specified color) with respect to the generated color-integrated image data; and marker-position-data calculating and outputting means for calculating a color marker position of the shot subject based on the extracted marker specified-color pixel data and outputting, as motion data of the subject, marker position data obtained as a result of the calculation.

With this systems image information about color markers on the subject can be dramatically reduced in amount by integrating and consolidating enormous color information of, for example, RGB image signals into a specified number of color groups. Thus, the whole system can be simplified in construction.

The above system may comprise information separating means for, through a process of decoding the color image signal, separating the color image signal into luminance information, which is information on luminance, and chromatic information, which is information on chromatic components. In this cage, the color-integrated image data generating means may be so arranged as to generate the color-integrated image data by integrating and consolidating mainly the separated (or separated and corrected) chromatic information into a specified number of color groups. As a result, the system construction less affected by variations in quantity of light can be realized in addition to the aforementioned simplified system construction.

Also, the system may further comprise image signal digital converting means for converting the color image signal into digital form, and image data generating means for generating image data of the subject by fetching the digitally converted color image signal in specified time intervals. In this case, the information separating means separates chromatic information of pixels of the image data into luminance information comprising a single component, and chromatic information comprising two components of a first chromatic component and a second chromatic component, and the color-integrated image data generating means comprises a color-integration look-up table memory which has stored a correspondence relationship between combinations of first chromatic component information groups and second thromatic component information groups obtained by dividing the first chromatic component information and the second chromatic component information into a specified number of groups, respectively, and chromatic information after the integration (hereinafter, referred to as integrated chromatic information), wherein the color-integrated image data generating means reads, with respect to each pixel, the integrated chromatic information to which the first chromatic component and the second chromatic component of the pixel correspond, from the color-integration look-up table memory in a dictionary-like manner, and assigning the reading result as chromatic data of the pixel.

That is, in order to prepare motion data of a moving subject, image data comprising a set of many pieces of data need to be prepared to many frames, and moreover a great many times of arithmetic operations need to be done for the identification of color marker image portions and the calculation of their marker position data. Further, to obtain motion images of real motion, there is a need of increasing the number of frames per unit time, which causes the number of calculations for marker position data to also increase. Then, with the above constitution, the integration process of two chromatic components of color image data can be promptly achieved by using the look-up table (which hereinafter may be abbreviated as LUT) memory so that the amount of data involved in the calculations can be greatly reduced. Thus, fast motion picture processing can be achieved with simple circuit construction.

More specifically, the chromatic information correcting means may comprise a correction look-up table memory which has stored a correspondence relationship between combinations of integrated chromatic information groups and luminance information groups obtained by dividing the integrated chromatic information and the luminance information into a specified number of groups, respectively and chromatic information after the luminance correction, wherein the chromatic information correcting means reads, with respect to each pixel, chromatic information after the luminance correction to which the integrated chromatic information and the luminance information of the pixel correspond, from the correction look-up table memory in a dictionary-like manner, as corrected color data of the pixel. With this constitution, the reduction in information amount can be achieved more effectively by performing the correction in such a way that luminance information is incorporated into the integrated chromatic information with the use of the correction look-up table memory, and moreover the system is less affected by variations in quantity of light. Thus, the marker position data can be generated with higher precision.

In the above constitution, incorporation (correction) of luminance information is done after the integration of two kinds of chromatic information However, this sequence may be inverted, i.e., the two kinds of chromatic information may be integrated after being corrected with luminance. More specifically, the chromatic information correcting means comprises first and second correction look-up table memories which have stored correspondence relationships between combinations of integrated chromatic information groups and luminance information groups obtained by dividing the chromatic component information and the luminance information into specified numbers of groups in correspondence to the first chromatic component and the second chromatic component, respectively, and chromatic information after the luminance correction, wherein the chromatic information correcting means reads, with respect to each pixel, chromatic information after the luminance correction to which chromatic information and luminance information of the pixel correspond, from their corresponding correction look-up table memories, respectively, in a dictionary-like manner, as corrected chromatic information of the pixel. Further, the color-integrated image data generating means uses the first chromatic information and the second chromatic information those after the luminance correction.

Next, when the system further comprises image signal digital converting means for converting the color image signal into digital form, and image data generating means for generating image data of the subject by fetching the digitally converted color image signal in specified time intervals, the marker-position-data calculating and outputting means may perform calculation and output of color-marker position data based on the marker specified-color pixel data successively and synchronously with the transfer period of the image data (e.g., the period of transfer clock pulse of pixels), for each of the image data. With this constitution, because the calculation of marker position data of each image frame can be executed synchronously with the transfer period of pixels (where, for example, the frequency of transfer clock pulse is about 8–30 MHz) with high speed in a pipeline fashion, the preparation of motion data including the marker position data for each frame can be achieved in real time during the image shooting. In particular, by adopting a clock pulse frequency of 10 MHz (e.g., 14–15 MHz), a high-speed processing environment particularly suitable for real-time preparation of motion data can be realized.

Generally, color image data are given in enormous information amounts as much as $2^8 \times 2^8 \times 2^8 = 16770$ thousands when each color component is described as 8-bit (2.56-step) data in the RGB three primary color representation, making it almost impossible to execute real time operations with the processing power of low-priced CPUs used in personal computers or the like. However, reducing the information amount by the integration and consolidation of color information as in the system of the present invention enables the real time operations even with low-priced CPUs (computers) of relatively low processing speed.

In this case, the marker-position-data calculating and outputting means may be so arranged as to calculate and output, for the frame of each of image data, color-marker position data including a total sum $\Sigma x$ of horizontal coordinate components x and a total sum Σy of vertical coordinate components y of pixels included in the marker image area, and a number n of pixels in each area. With this constitution, the centroidal position γ of the image for a color marker can be easily determined by (Σx/n, Σy/n). The centroidal position is not affected by the rotational movement of color markers and therefore easy to manage as motion data and useful for motion image processing.

Furthermore, there is an advantage that Σx and Σy can be simply calculated by utilizing the image synchronization control unit that is necessarily provided, for example, in video image pickup equipment using the normal scanning system. That is, the image signal from the image pickup device is decomposed into pixels, delimited into the individual scanning lines and transferred sequentially. During this transfer, normally, horizontal and vertical synchronizing signals are inserted in the pixel data train. Therefore, then the horizontal coordinate of each pixel on the screen can be specifically determined by counting the number of transferred pixels since the reception of the horizontal synchronizing signal on the receiver side. It is needless to say that the counting of transferred pixels can be done, of course, by using the pixel transfer clock pulse and therefore promptly processed. Meanwhile, by counting the number of scanning lines (equivalent, erg., to the number of horizontal synchronizing signals inserted every one scanning line) since the reception of the vertical synchronizing signal, the vertical coordinate can also be specifically determined. Further, because all of Σx, Σy, and n are simple summed-up amounts, fast processing can be achieved with an extremely simple circuit construction using adders, thus advantageous also in executing the real time operations.

In addition, when smaller numbers of colors are contained in the original image signal, the calculation processing using Σx, Σy and n can be simply implemented by a system constitution as shown below. That is, the system comprises:

one or a plurality of color cameras for shooting motions of a subject in a state that color markers are attached to the subject or that part of the subject is determined as a color marker;

image data generating means for successively generating image data of the subject on a frame basis by fetching color image signals based on image outputs from the color cameras in specified time intervals;

marker specified-color pixel extracting means for extracting data of pixels having a color previously specified as a color of the color marker (hereinafter, referred to as marker specified color) with respect to the successively generated image data; and marker-position-data calculating and outputting means for, on an assumption that a set of pixels having the marker specified color are taken as a marker image area, calculating marker position information including a total sum Σx of horizontal coordinate components and a total sum Σy of vertical coordinate components y of pixels contained in the marker image area as well as a total number n of pixels in each area, successively in synchronization with a transfer period of the pixels, with respect to each frame of each of the image data.

Next, each of the look-up table memories used in the above constitutions may be so arranged as to designate read-object data specifying information, such as the first and second chromatic component information, the luminance information or the integrated chromatic information, by means of an address line, so that read-object data specified by the read-object data specifying information is read from the memory cell designated by the address in a dictionary-like manner. Also, the system may further comprise read control means serving for making the process of reading the read-object data from the look-up table memory for each of image data carried out successively in synchronization with a transfer period of the pixels. By adopting the look-up table memories having the above constitution, read-object data can be fast accessed by designating the read-object data specifying information by the address line. As a result, high-speed processing synchronized with the pixel transfer period can be realized so that the aforementioned real time processing is enabled without any difficulties In addition, the color camera may be provided in a plurality. In this case, the system may further comprise a switch to which the plurality of color cameras are connected, and by which cameras with which the subject is shot are selected by switching a state of connection to the cameras. With this arrangement, it becomes possible to generate two-dimensional-like motion data. Moreover, even when one color marker has come to a dead angle, another color camera is enabled to detect this reliably. Thus, the precision for generated marker position data can be improved.

BRIEF DESCRIPTION OF THE DRAWINGS

FIG. 8 is a conceptual view of the two-dimensional look-up table memory;

DETAILED DESCRIPTION OF THE PREFERRED EMBODIMENTS

Hereinbelow, embodiments of the present invention are described with reference to examples thereof as illustrated in the accompanying drawings.

Figure 1:
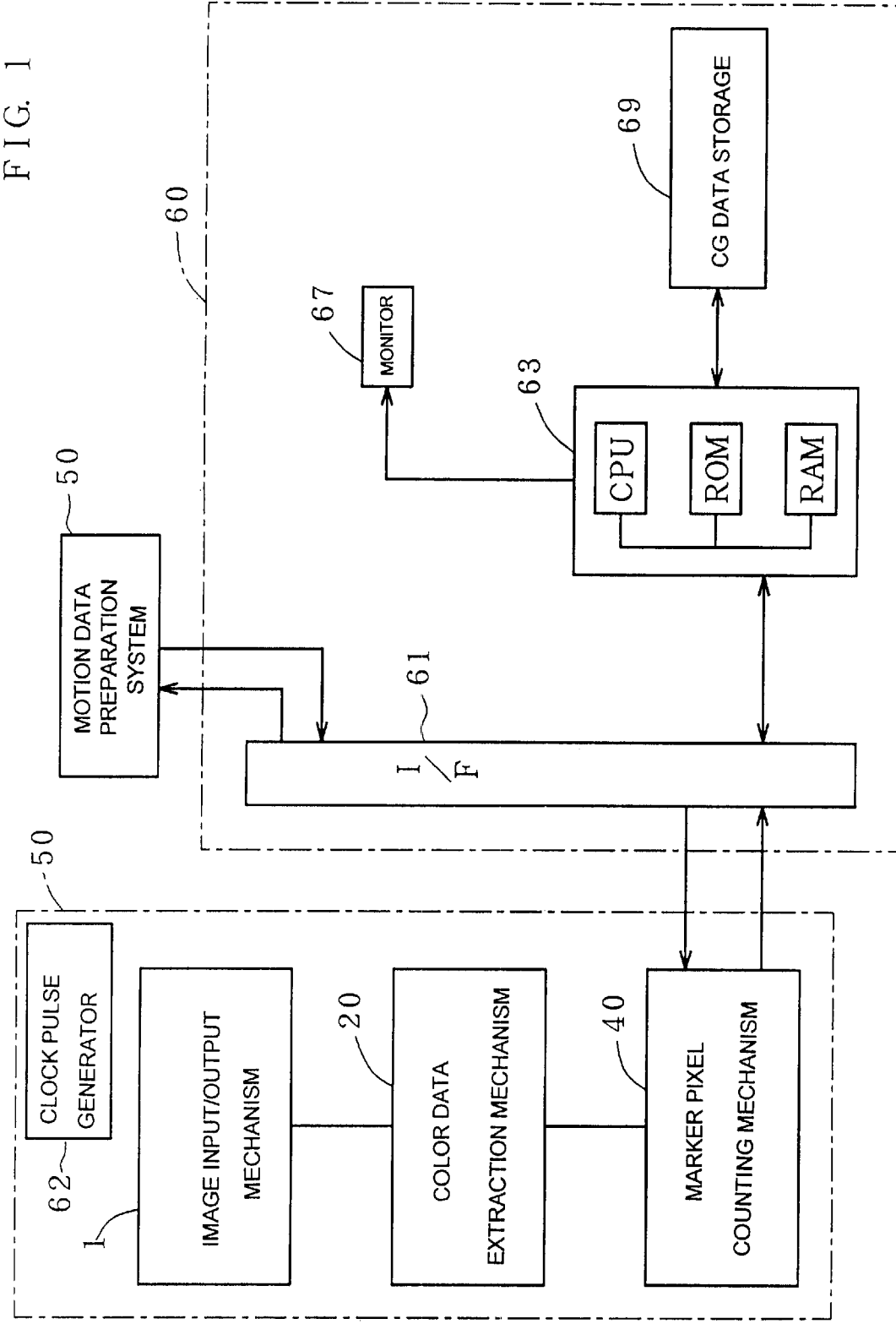
FIG. 1 is a block diagram showing an overall configuration of a motion data preparation system which is an embodiment of the present invention.

FIG. 1 is a block diagram showing one example of the motion data preparation system of the present invention together with its peripheral equipment. Two sets of motion data preparation systems 50 each comprising a color camera are connected, for three-dimensional image taking (i.e., stereo image taking) of a subject, to an image data processor 60 including a host computer 63. These motion data preparation systems 50, 50 have similar constitution and typified by one of them in the following description.

More specifically, the motion data preparation system 50 roughly comprises an image input/output mechanism (image data generating means) 1, a color data extraction mechanism (color-integrated image date generating means) 20 and a marker pixel counting mechanism (marker-specifying color extracting means, marker-position-data calculating and outputting means). 40, and is connected to a host computer 63 for preparing animations and CG motion pictures via an I/F board 61. Reference character 62 denotes a clock pulse generator for giving a pixel transfer clock pulse.

Figure 2:
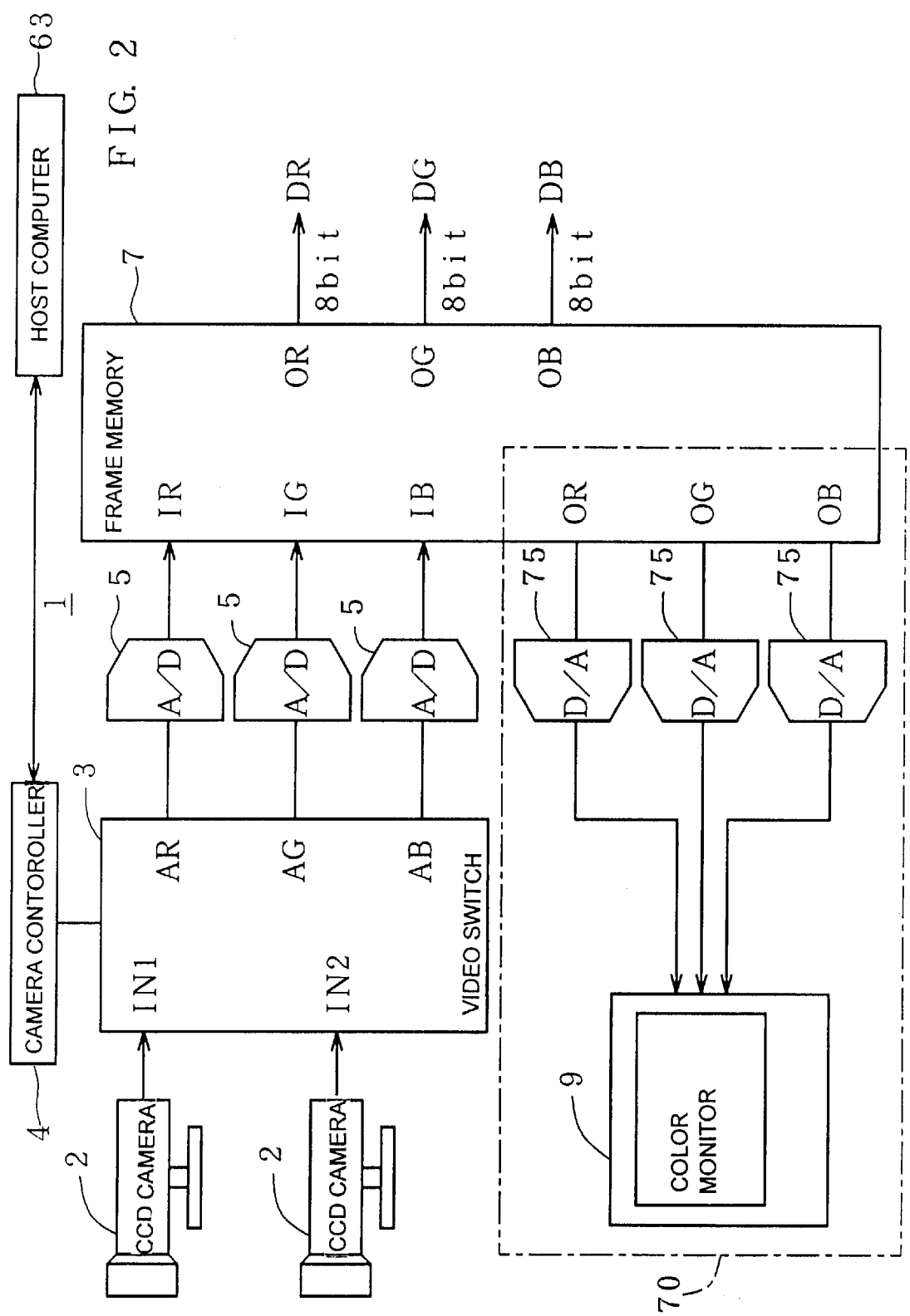
FIG. 2 is a block diagram showing one configuration example of the image input/output mechanism of the system.

First, FIG. 2 is a block diagram showing details of the image input/output mechanism 1. In the image input/output mechanism 1, two color cameras 2 are set in this example (otherwise, any larger plurality of color cameras may be provided). These color cameras 2 for taking images of a subject (e.g., a model of man such as an actor) are well-known CCD cameras, and both connected to a video switch 3. Their connecting terminals are denoted by IN1 and IN2.

A camera controller 4 is connected to the video switch 3. This camera controller 4, upon receiving a command from the host computer 63, feeds a control signal to the video switch 3 for switching over, as required, the switch terminal that determines a connection state of the video switch 3. Output of the two color cameras 2 are switched in the way that, for example, when a specified color marker on the subject has come to a dead angle in one camera 2, the other camera 2 out of the dead angle is selected. This is implemented by tracing the centroidal position of the color marker on the host computer 63 side with the following techniques. That is, one technique may be that a reference position (e.g., center position) is set with respect to the field to view for image taking of each camera 2, 2 and a camera in which the centroidal position of the color marker is closer to the reference position than in the other camera is selected, or another technique may be that the moment the centroid of the color marker has gone out of the field of view of one camera, the other camera is selected.

In this connection, the switching time for between the cameras 2, 2 is set so as to be terminated, for example, in a switching interval of an image frame, in a period of a null scanning line inserted in succession to a vertical synchronizing signal as described later. More specifically, the time is about 1/30 second. In addition, when the color marker is free from the possibility of coming to the dead angle, it is also possible that only one color camera 2 is used.

Image signals AR, AG and AB of R (red signal), G (green signal) and B (blue signal) of the selected camera 2 are converted into digital signals by A/D converters (image-signal digital converting means) 5, and then each temporarily stored in an image memory (image data generating means) 7 (frame memory), as 8-bit information. The image memory 7 is so arranged as to be able to store inputted image data IR, IG, IB, and besides to be able to transmit the one-frame-preceding inputted and stored image data to a monitor mechanism 70 (which comprises D/A converters 75 for converting digital image data into analog data, and a color monitor 9, where the monitor mechanism 70 may be omitted), as well as to the color data extraction mechanism 20 of FIG. 3, the image memory 7 being enabled to perform high-speed processing without rest.

In the motion data preparation system 50, the digitized image data R, G, B are decoded into Y, R-Y, B-Y, which are in one form of representation in which luminance and color are separated from each other. Although the form of image representation by Y, R-Y, B-Y is already known and its detailed description is omitted, Y denotes a luminance signal, R-Y and B-Y denote a red color difference signal and a blue difference signal, respectively, where the latter two provide a two-dimensional coordinate space with hue and chroma taken as independent parameters by excluding the luminance signal (where the two-dimensional coordinate space corresponds to first and second chromatic component information). By using such a representation form, color is represented by the two-dimensional space of hue and chroma, thus making color specification easier, and moreover the luminance is independent, marking it possible to achieve processing less affected by the illumination, as advantages. Now, the processing is outlined below.

First, although image signals from the color cameras 2 can be converted into the above form of representation easily, for example, by adopting the NTSC decoding system using a video composite signal for the (Y, R-Y, B-Y) system, here is described below a method for conversion from RGB signals to digital signals. For this method, by using a relational equation of Eq. 1 in the form of a matrix held between RGB image data and (Y, R-Y, B-Y) system image data, RGB digital image data is subjected to the matrix operation so as to be converted into (Y, R-Y, B-Y) image data.

$$\begin{bmatrix} Y \\ R-Y \\ B-Y \end{bmatrix} = \begin{bmatrix} 0.299 & 0.587 & 0.114 \\ 0.701 & -0.587 & -0.114 \\ -0.299 & -0.587 & 0.886 \end{bmatrix} \cdot \begin{bmatrix} R \\ G \\ B \end{bmatrix} \quad \text{Eq. 1}$$

Meanwhile, it is known that such a relation as shown by Eq. 2–4 generally holds between luminance (V), hue (H), chroma (C), and color difference signals (R-Y), (B-Y).

$$V:Y \quad \text{Eq. 2}$$

$$H = \tan^{-1}(R-Y/B-Y) \quad \text{Eq. 3}$$

$$C: \sqrt{(R-Y)^2 + (B-Y)^2} \quad \text{Eq. 4}$$

Therefore, for extraction of a specified color of a color marker (CM), an objective area color necessary for analysis is designated from a two-dimensional space independent of the luminance represented by hue (H) and chroma (C), by using a plurality of color cutout functions Fn, and numbering of color marker (CM) in done with respect to the extracted chromatic area as shown in Eq. 5.

$$Qn = Fn(H, C) \quad \text{Eq. 5}$$

Further, with respect to the chromatic areas for the individual color marker (CM) extracted by hue (H) and chroma (C), numbering (Rn) of color markers (CM) is done with respect to the color areas extracted by using a cutout function Gn by luminance (V) (Eq. 6). As a result, an area of the color marker (CM) having specified luminance (V), hue (H) and chroma (C) can be extracted and a consequence can be obtained as a color marker signal.

$$Rn = Gn(Qn, V) \quad \text{Eq. 6}$$

Hereinbelow, the processing in actual circuits is explained. First, digital image data DR, DG, DB (FIG. 2) fed from the color cameras 2 via the image memory 7 are corrected for linearity, white balance and the like by preparatory-correction look-up table memory (LUT) circuits 121–123 (e.g., 256 bytes) of the color data extraction mechanism 20 of FIG. 3, respectively. Detailed construction of these LUT circuits 121–123 is described later.

Figure 4:
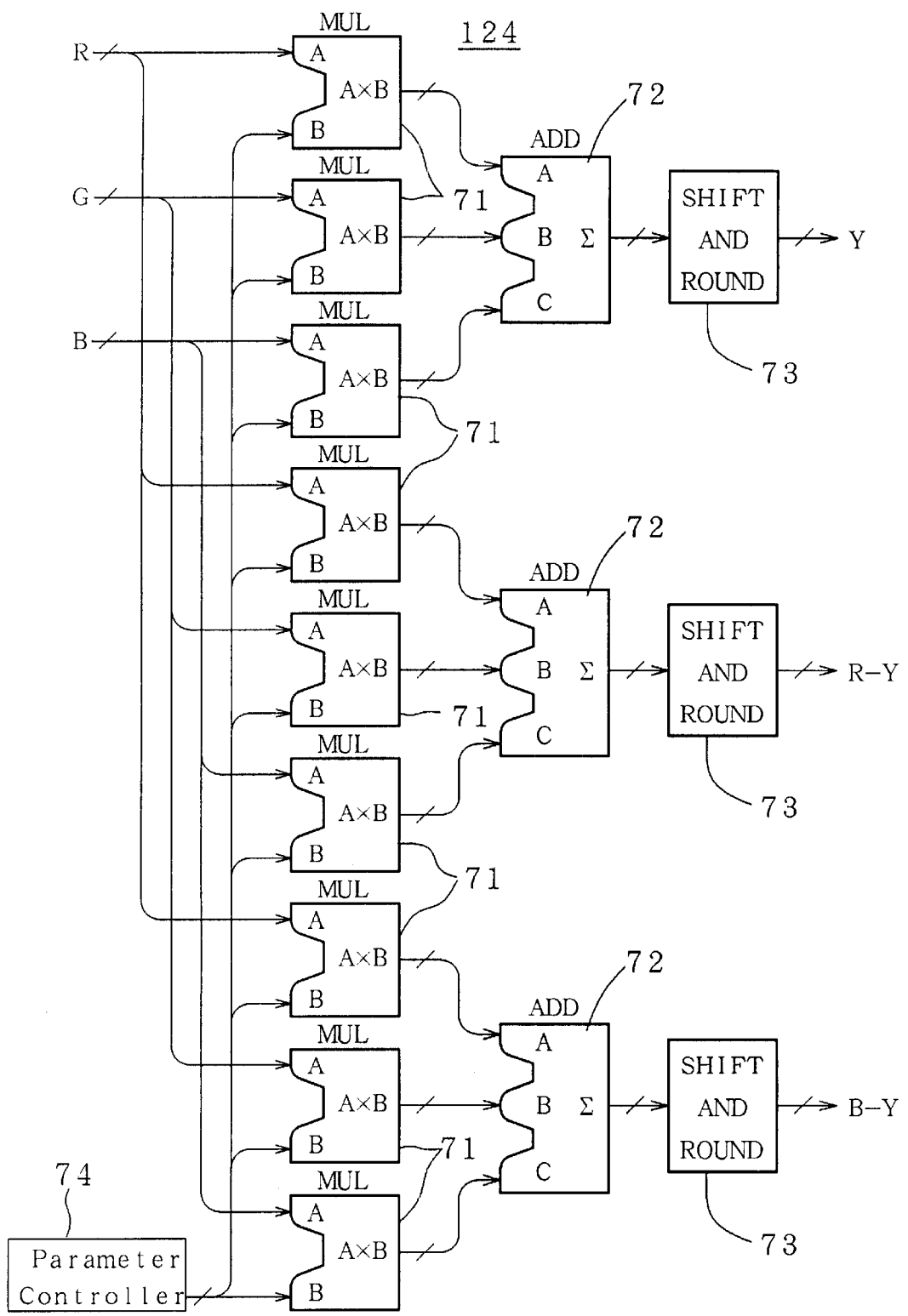
FIG. 4 is a circuit diagram showing one configuration example of a color converter.

These corrected image data are inputted to a color converter 124 (information separating means) so that (R, G and B) information is converted into (Y, R-Y, B-Y) information. This color converter 124, as shown in FIG. 4, comprises nine multipliers. 71, three adders 72 and three dividers 73. Accordingly, Eq. 1 can be represented in the form of matrix development as follows:

$$Y = 299R + 0.587G + 0.114B \quad (1)$$

$$R-Y = 0.701R + (-0.587)G + (-0.114B) \quad (2)$$

$$B-Y = (-0.299)R + (-0.587)G + 0.886B \quad (3)$$

Then, nine multipliers 71 are intended to perform the multiplications of the terms of the above expressions (1) to (3), and multiplication results of the terms of the individual expressions are added to inputted (R, G, B) data by the corresponding adders 72, respectively. In addition, the dividers 73 are provided to extract individual signals (Y, R-Y, B-Y) of necessary bits (8 bits in this case) from the calculation results of the multiplications and additions. In this way, calculated values of (Y, R-Y, B-Y) after the conversion are obtained. It is noted that reference numeral 74 denotes a parameter controller for outputting coefficient values for the individual terms of the expressions (1) to (3).

Figure 3:
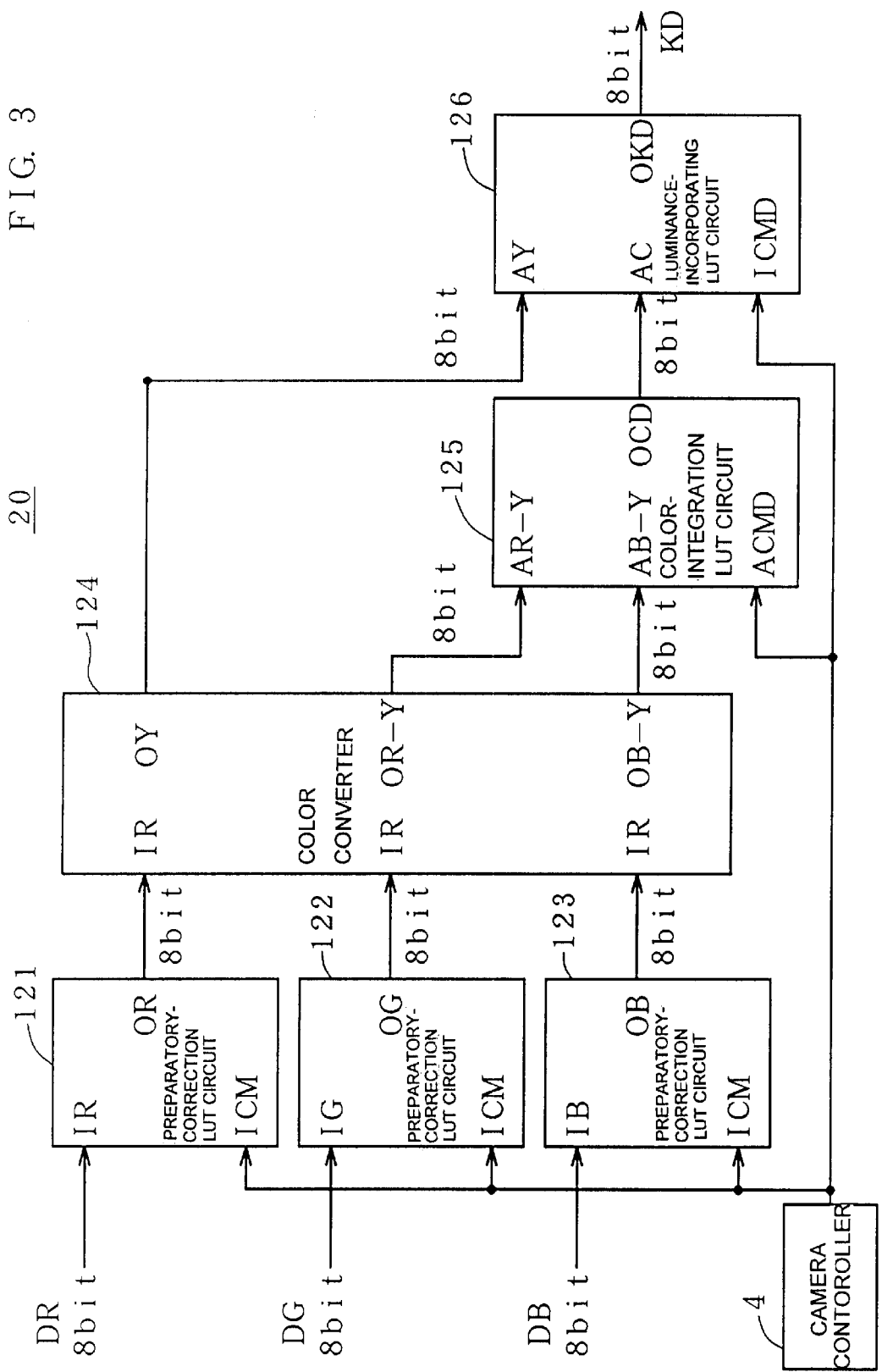
FIG. 3 is a block diagram showing one configuration example of the color data extraction mechanism of the system.

The following circuit portion is intended to extract the area for a color marker (CM) of a specified color from the color space represented by luminance (Y) and red color difference (R-Y), blue color difference (B-Y). An outline of this is given below. A table of results of the calculation Fn (x, y) for performing the calculation of Eq. 5 is preliminarily set to a color-integration LUT circuit (look-up table memory for color integration). 125 as shown in FIG. 3, while a table of results of the calculation Gn (Xr y) for performing the calculation of Eq. 6 is preliminarily set to a luminance-incorporating LUT circuit (look-up table memory for correction) 126, so that Rn, which is the number of a color marker (CM), can be extracted in a dictionary-like manner. Inputting data signals of red color difference (R-Y) and blue color difference (B-Y), which serve as indications for hue (H) and chroma (C) as shown in Eq. 5, to the color-integration LUT circuit 125 allows the number of a color marker (CM) for which the chromatic area shown by Eq. 6 to be obtained. Next, this output is inputted to the luminance-incorporating LUT circuit (look-up table memory for correction) 126 together with the (Y) signal showing the value of luminance, by which the extraction of the chromatic area for a color marker (CM) including the luminance shown by Eqs. 7 and 8. As a result, the numbers of color markers (CM) specified by luminance (V), hue (H) and chroma (C) up to 255 are obtained.

$$Xn = \Sigma Xn/Nn \quad \text{Eq. 7}$$

$$Yn = \Sigma Yn/Nn \quad \text{Eq. 8}$$

This is described in more detail below. First, the LUT circuits 121–123 and 125, 126 of FIG. 3 each have a function of previously registering calculation results for all the input data in memory, and selectively outputting registered data by using address lines for data input, thereby outputting a calculation result in a dictionary-like manner, as is well known.

The flow of data processing can be outlined as follows. Image data is divided and integrated into a limited number of color groups by the color-integration LUT circuit 125, so as to be integrated into 8-bit, 256 types of color groups. Also, the luminance-incorporating LUT circuit 126 subjects the integrated color data to correction process with a luminance signal. Further, a signal derived from the camera controller 4 is outputted as data on the currently processed camera number. These data are fed to the LUT circuits 125, 126.

A 1-bit (2-bit for four cameras, and 3-bit for eight cameras) signal from the camera controller 4 is fed to the LUT circuits 125, 126. First, R-Y data and B-Y data are inputted to the color-integration LUT circuit 125. Furthers the camera number signal of the camera controller 4 in also inputted to this color-integration LUT circuit 125. Here, the data are integrated (consolidated) into plural kinds (8-bit) of color groups used as color markers from the hue and chroma space data for each color camera, and divided and integrated into necessary color groups including the luminance by the luminance-incorporating LUT circuit 126, where results are outputted as color group numbers of 256 kinds in 8-bit representation.

More specifically, chromatic components identified by, for example, 8 bits of R-Y components and 8 bits of B-Y, which count 65536, are divided and integrated into 256 kinds of color groups. Conceptually, 256 combinations of color groups from 1 to 256 necessary are preliminarily set (registered), and these have been registered in the luminance-incorporating LUT circuit 126. All the combinations of R-Y data, B-Y data and the like are classified (categorized) one by one by the LUT circuits 125, 126 so as to belong to one of these 256 kinds of color groups. In other words, calculation results (256 color groups) for all input data (individual 16-bit data items) on color data (hue or luminance) are registered in the memory, and the previously registered data (i.e., one of the 256 color groups) is selectively outputted with the address line used for data input, by Which 16-bit chromatic components are integrated into the 8-bit color groups FIG. 8 conceptually shows one example of memory cells of the LUT circuit, giving a two-dimensional table from which, with 16-bit input data assumed as data A and data B, upon selection of an address line corresponding to those contents, one o the registered data DR 11, DR 12 . . . etc. of the corresponding cell is read.

Figure 10:
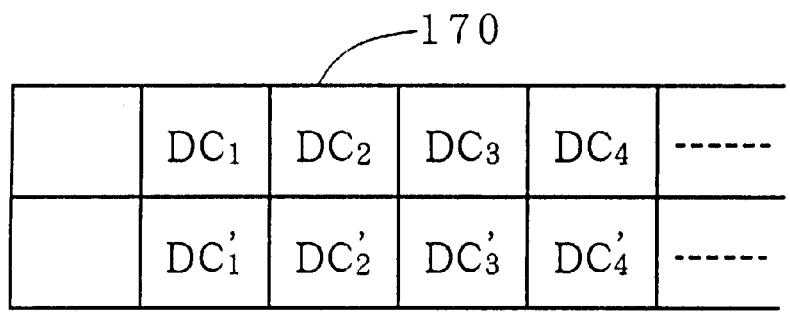
FIG. 10 is a conceptual view of the one-dimensional look-up table memory.

Meanwhile, the preparatory-correction LUT circuits 121–123 to be placed at a stage preceding the color converter 124 are intended to perform correction for linearity, white balance and the like of the R, G, B signals. Its memory cell part, as shown in FIG. 10, constitute a one-dimensional table in which input values of R, G, B data (signals) and their correction values are associated in one-to-one correspondence.

Static RAMs (SRAMs) are used as the LUT circuits 121–123, 123, 125, 126, allowing any optional setting of 256 combinations of color data. Further, since input signals of camera numbers are fed to the LUT circuits 121–123, 125, 126, it in also possible to set 256 color groups which differ from one camera number to another. In addition, the SRAM eliminates the need of circuitry for refresh, contributing to a simplification of the whole system.

In this way, color representations of about 16770 thousands of colors for an input image of 24 bits (Y: 8 bits, R-Y: 8 bits, B-Y: 8 bits) are integrated and divided for each color camera, and outputted as 256 kinds of color group signals. Thus, the amount of information is consolidated to about 1/60000, allowing a simple calculation to be realized.

Figure 5:
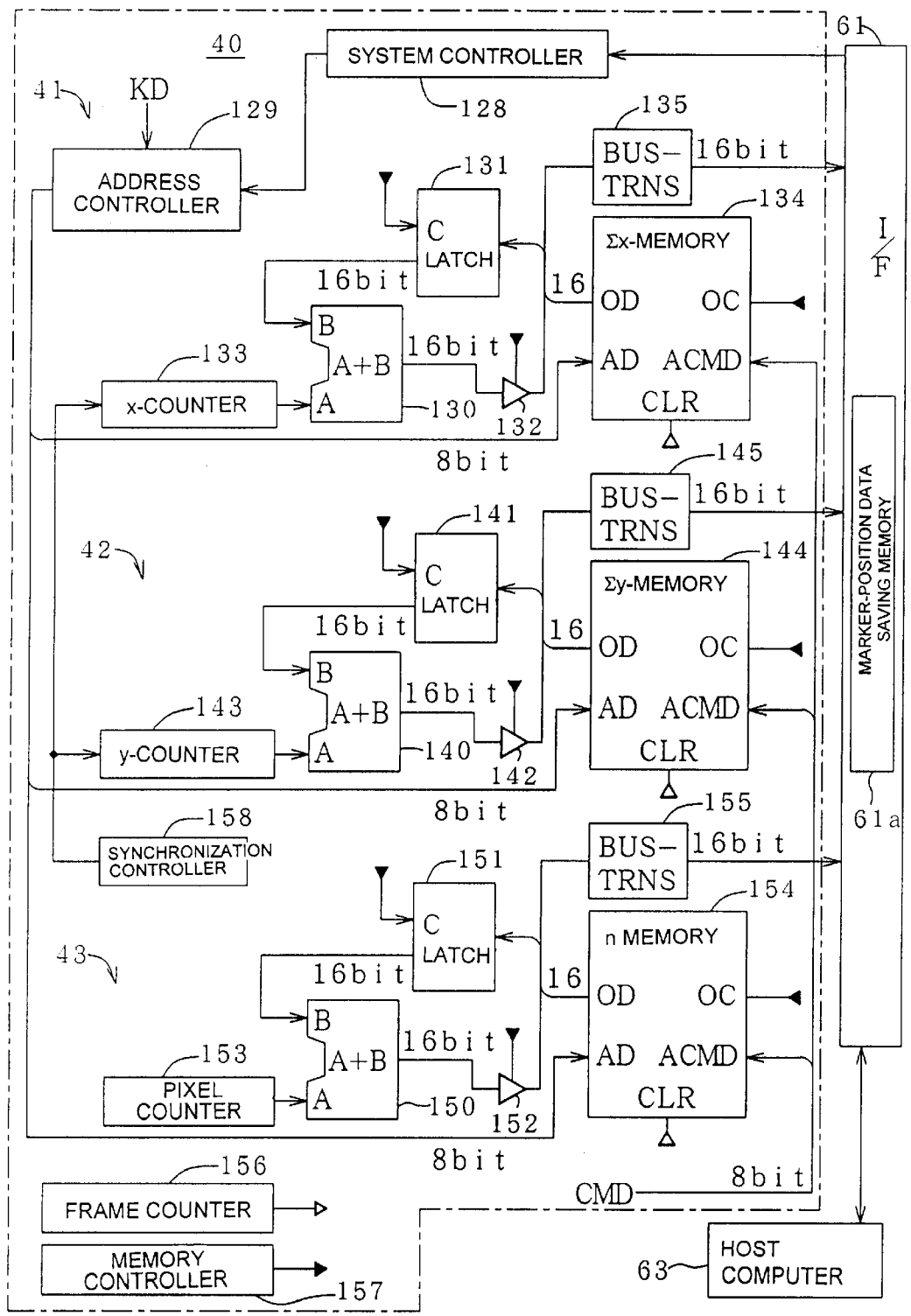
FIG. 5 is a circuit diagram showing one configuration example of the marker pixel counting mechanism of the system.

Image data reduced in information amount in this way is sent to the marker pixel counting mechanism 40 of FIG. 5. In this unit, an area comprising pixels of the specified marker color (i.e., number) is extracted for each frame of the image data, and marker position data on the screen is calculated.

The marker pixel counting mechanism 40 comprises three counting circuit systems 41–43 each of which calculates a sum Σx of x-coordinates, a sum Σy of y-coordinates and the number n of the pixels of the specified marker color. These counting circuit systems 41–43 have generally similar constitution, and so the following description will he made on the first counting circuit system 41. This counting circuit system 41 comprises an adder 130, a Σx-memory 134 for storing a cumulative total of outputs of the adder 130, and the like as main components. These components are connected to one another via a latch 131 (implemented by an RS flip-flop with an inhibit input (hereinafter, flip-flop will be abbreviated as FF)) and a tri-state buffer 132, where a bus transfer 135 and a memory controller 157 (which feeds control signals to the memory 134, the tri-state buffer 132 and the latch 131) are attached. In addition, the memory controller 157 is in common to the other counting circuit systems 42, 43.

The Σx-memory 134 is zero cleared in the initial state. First, an address controller 129 specifies an address of the storage area of Σx-data for each marker color based on address information derived from the host computer 63, and selects a memory area for the address corresponding to the pixel color. When a first target pixel (e.g., the upper left pixel on the screen) after processed by the color data extraction mechanism 20 of FIG. 3 has entered this counting mechanism 40, camera-number data (CMD) and color data of the pixel are inputted to the address line of the Σx-memory 134 via the address controller 129. In addition, a system controller 128 serves the roles of, upon receiving a command from the host computer 63, controlling the operation of the address controller 129 for reading and writing data from and to the Σx-memory 134 according to the situation of access to the Σx-memory 134 and notifying the host computer as to whether data write/read is enabled or disabled.

Then, in the first counting circuit system 41, an x-counter 133 counts the number of transferred pixels until a target pixel is transferred up by referencing a horizontal synchronizing signal generated by a synchronization control unit (read controlling means) 158, the count value being inputted to A of the adder 130 as a horizontal coordinate value on the screen for the pixel. The transfer control of pixels is controlled according to a clock pulse signal issued by the clock pulse generator 62 of FIG. 1. Meanwhile, the memory controller 157 transmits an output command signal to an output control port (OC) of the Σx-memory 134, making the Σx-memory 134 output a stored value of the x-coordinate summed-up value (Σx) of the corresponding color data, and feeds a holding signal to the latch 131, making the signal held. Then, the count value (i.e., an x-coordinate of a new pixel) A from the x-counter 133 and a value B of the latch 131 are summed up by the adder 130. Next, the memory controller 157 enables the tri-state buffer 132. As a result, the summed-up output value of the adder 130 is written to the same address of the Σx-memory 134 again through the tri-state buffer 132 so that the summed-up stored value is updated. Thus, the processing for one pixel is completed.

Next, the second counting circuit system 42, generally like the first counting circuit system 41, also comprises an adder 140, a Σy-memory 144 For storing a cumulative total of outputs of the adder 140, and the like as main components. These components are connected to one another via a latch 141 and a tri-state buffer 142, where a bus transfer 145 is attached. The second counting circuit system 42 operates in the generally same manner as the first counting circuit system 41, but the input to the adder 140 operation is a count output value of a y-counter 143 that counts the number of scanning lines from when the y-coordinate value of a pixel, i.e., a vertical synchronizing signal from a synchronization control unit 158 to when the target pixel position is reached (the number can be substituted, for example, by a number of horizontal synchronizing signals inserted every one scanning line), and its summed-up output value is a cumulative total value of the y-coordinates Also, the that counting circuit system 43 also comprises an adder 150, an n-memory 154 for storing a cumulative total of outputs of the adder 150, a latch 151, a tri-state buffer 152 and a bus transfer 155. The input to the adder 150 is an output of a pixel counter 153 that issues one count pulse each time one pixel having a specified marker color comes up, and the summed-up output value of the adder 150 is the total number n of pixels of the image area of the corresponding color marker.

As a result of performing this sequence of operations on the whole screen of the currently operating color camera 2, the total sum Σx of x-coordinates of the individual color markets (CMs) are stored into the Σx-memory 134, the total sum Σy of y-coordinates is stored into the Σy-memory 144, and further the total number n of pixels is stored in an n-memory 154 as calculation results, respectively. Upon reception of an output command signal from the memory controller 157, those stored values are transferred from the memories 134, 144, 154 via their corresponding bus transfers 135, 145, 155 to the host computer 63 by date bus. Then, when the processing for one-frame image data is completed, the contents of the individual memories 134, 144, 154 are cleared by a signal from a frame counter 156, and similar process is iterated on image data of the succeeding frame. In this way, the values of the above Σx, Σy and n for the individual color markers are calculated and generated in real time as marker position data with respect to image data successively generated by the image taking with the color camera 2, and outputted to the host computer 63.

It is noted that while the memories 134, 144, 154 are being read by the host computer 63, it is inhibited to perform the clearing of the memories and the writing of new data which would be involved in a switch of image frames. Therefore, in this embodiment, data storage values of Σx, Σy and n in the memories 134, 144, 154 are temporarily saved to a marker-position data saving memory 61a (which may be provided, for example, on the I/F board 61), thus making it safe even if the data values should be cleared. After this arrangement, the data stored values are read by the host computer 63. In this case, the marker-position data saving memory 61a is implemented by a dual port memory (e.g., FIFO with sequential access type write and read ports), by which data write from the memories 134, 144, 154 and data read to the host computer 63 are alternately switched and performed by making use of switching intervals of image frames (e.g., periods of several blank scanning lines that are inserted in succession to the vertical synchronizing signal and that do not contribute to the image transfer).

Figure 6:
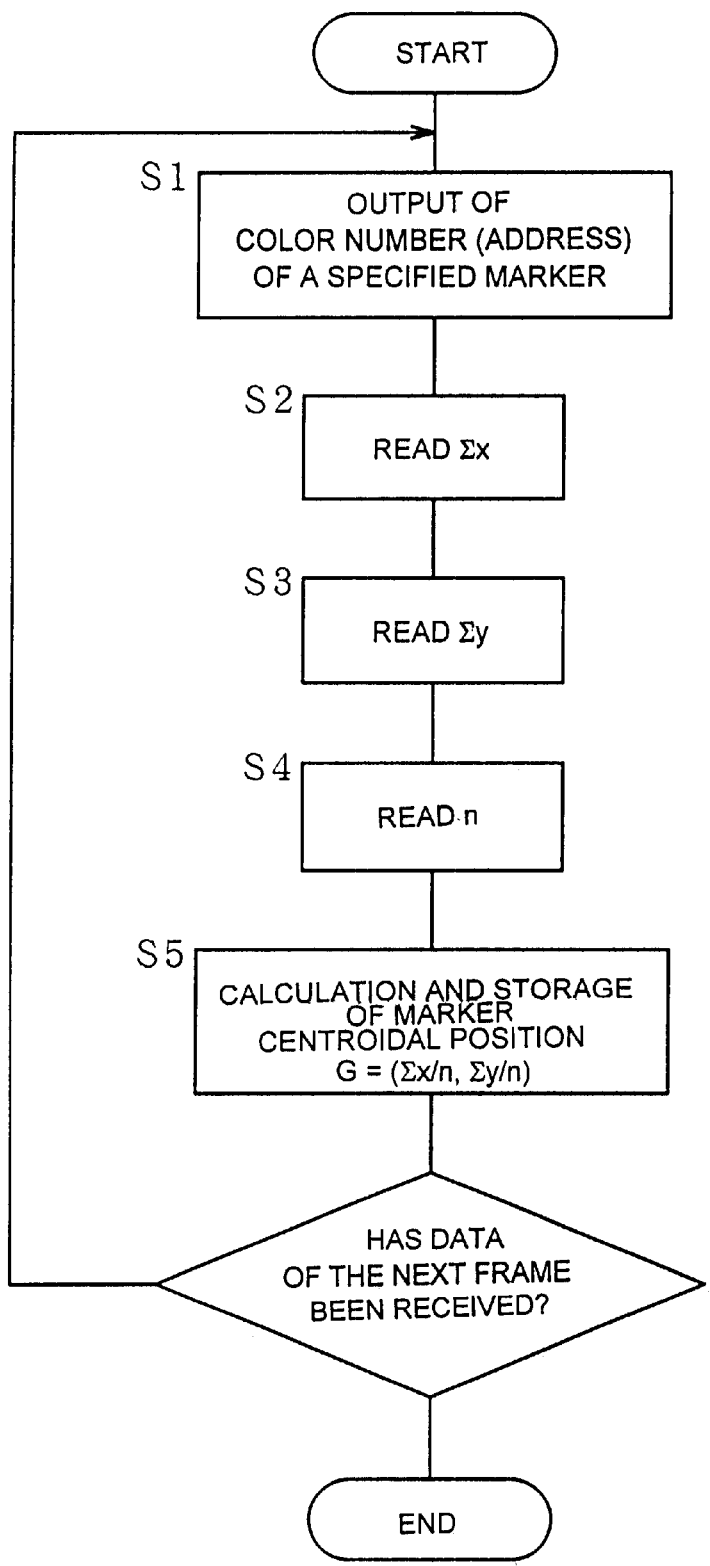
FIG. 6 is a flow chart showing one example of centroidal position calculation for a color marker.

As shown in FIG. 6 as an example, the host computer 63 in the FIG. 1 outputs a color marker number specified at 31, and reads the values or Σx, Σy and n of the color marker at S2 to S4. Then, by using this, the coordinates of the centroid of the color marker area are calculated and the results can be acquired as motion data of the subject. This motion data can be incorporated into CG data of animation or the like stored in a CG data storage 69 as motion data of an animation character, and outputted in demonstration on a monitor 67.

In addition, the color cameras 2 of the motion data preparation systems 50, 50 take images of the same subject at different angles while being switched over as required. Then, the values or Σx, Σy and n based on image data of the cameras 2, 2 of the systems 50, 50, respectively, are stored in different areas in the memories 134, 144, 154 with camera numbers added. Then, in the host computer 63, the data of Σx, Σy and n of the individual motion data preparation systems 50, 50 are read from the corresponding areas of the memories 134, 144, 154, and the centroidal position of the individual color markers in the different camera fields of view are calculated. As a result, it becomes possible to specifically determine the three-dimensional motions of color markers. In addition, when only the two-dimensional motions of the color markers have to be specifically determined, one of the motion data preparation systems 50, 50 may be omitted.

Figure 7:
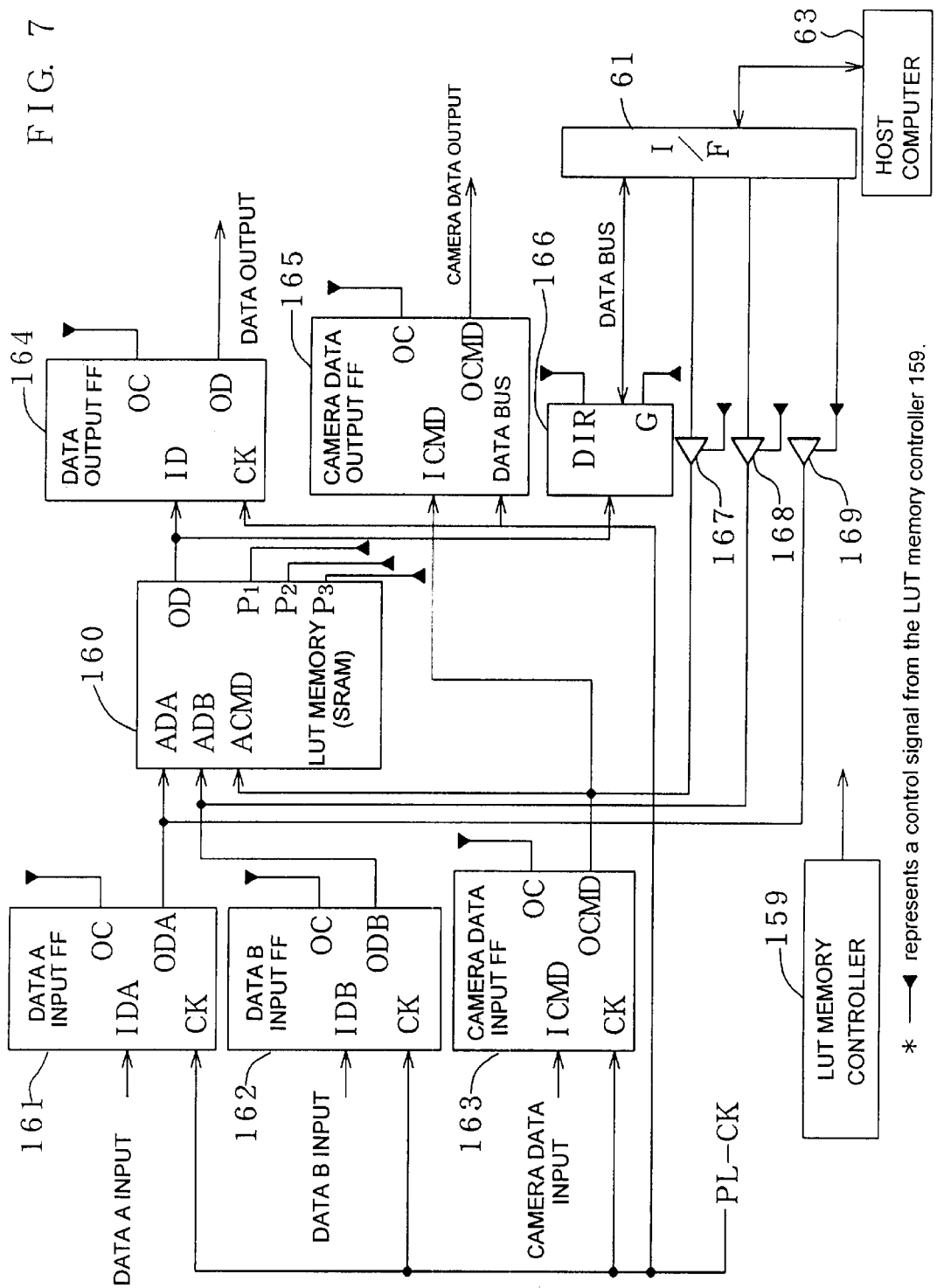
FIG. 7 is a circuit diagram showing in more detail a two-dimensional look-up table memory circuit.

Whereas five LUT circuits 121–123, 125 and 126 are present in FIG. 3, previously set color groups and other settings may be written from the host computer. 63 into these LUT circuits for initial settings. The LUT circuit 125 or 126 has the same hardware configuration, which is shown in more detail in FIG. 7. The whole of FIG. 7 constitutes one LUT circuit, corresponding to, for example, the color-integration LUT circuit 125. Input signals of data A and data B in FIG. 5 correspond to R-Y and B-Y, respectively, and these are outputted as 8-bit signals of OD. An LUT memory controller 159 (hereinafter, referred to as LMCN) is attached to an LUT memory 160. The LUT memory 160 has data flip-flops 161, 162 (e.g., implemented by LTK-FE) on its data input side and a data flip-flop 164 on its output side, and further data flip-flops 163, 165 for camera number data are present. Also, a data bus from the host computer 63 is connected to the LUT memory 160 via a bidirectional bus tranceiver buffer 166. An address bus from the host computer 63 connects to the address for data A of the LUT memory 160, the address for data B, and the address for camera number (CMD) via bus buffers 167–169, respectively.

For the initial setting of the LUT circuits, the host computer 63 transmits a bus request instruction to the LMCN 159 by using a LUT memory controlling signal (LMCNT). According to this, the LMCN 159 controls an output control signal (OC) for the data flip-flops 161–165 so as to disable the outputs of the data flip-flops 161–165, and besides controls an output enable signal G for the bidirectional bus tranceiver buffer 166 and the bus buffers 167–169 so as to enable these outputs. As a result, the host computer 63 is enabled to execute read and write operations on the LUT memory 160, so that the initial setting is done.

After the completion of data input to the LUT mmoyry 160, the host computer 63 transmits a bus release instruction (operation execution instruction) to the LMCN 159 by using the LMCNT. AS a result, the LMCN 159 controls the output enable signal G for the bidirectional bus tranceiver buffer 166 and the bus buffers 167–169, and controls the output control signal (OC) for the data glip-flops 161–165 as to enable the outputs of the data flip-flops 161–165. Consequently, calculation results determined in a dictidnary-like manner by the input data A and data B to the LUT memory 160 are outputted to the OD. In this connection, the data flip-flops 161, 162 and the like are operated by using a transfer clock pulse of a processing-target pixel synchronously with this, by which high-speed operation processing is realized. In addition, CK in each data flip-flop denotes a terminal for the clock pulse input, and DIR of the bidirectional bus tranceiver buffer 166 denotes a terminal for the bus direction control signal input.

Figure 9:
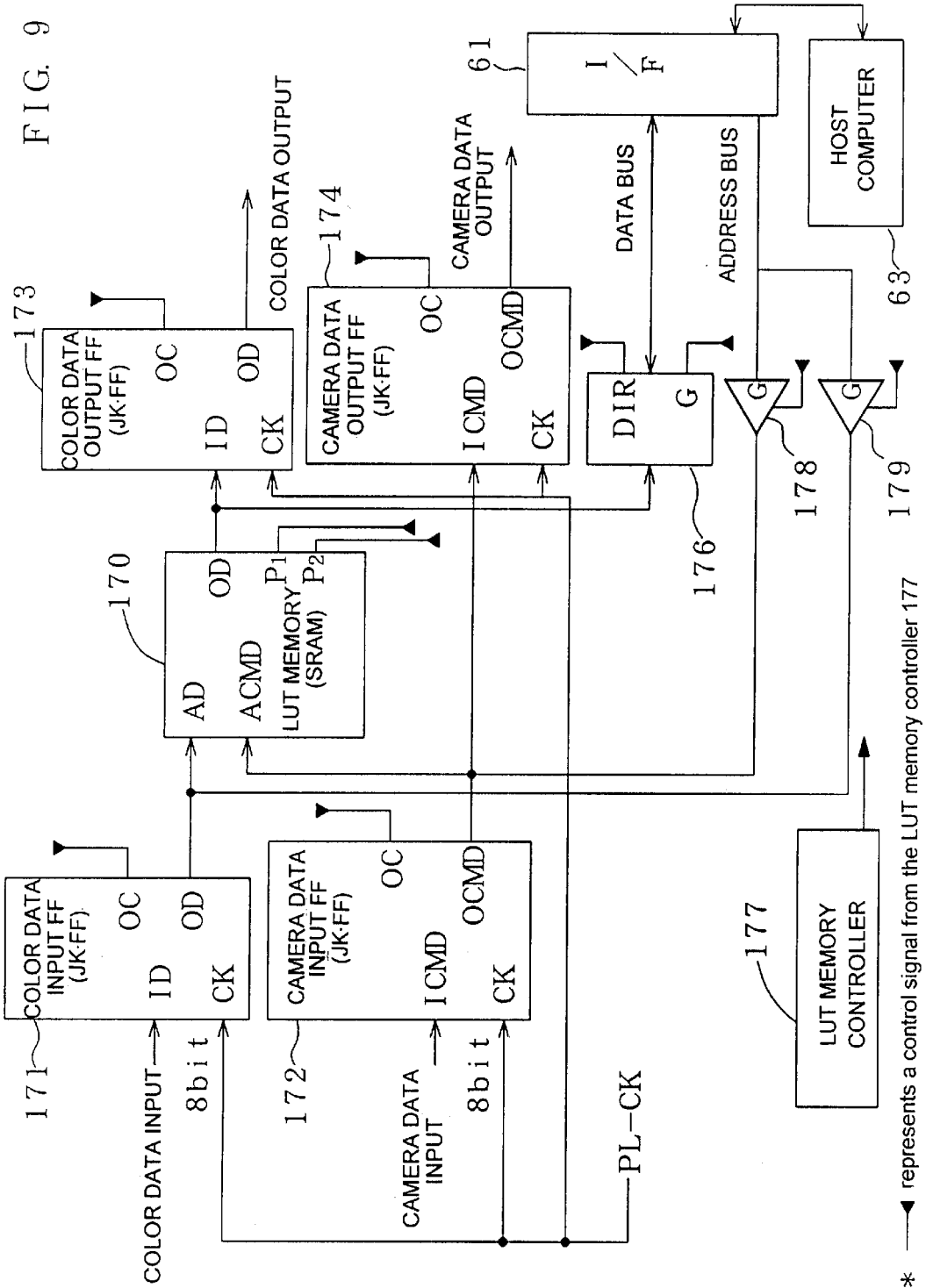
FIG. 9 is a circuit diagram showing in more detail a one-dimensional look-up table memory circuit.

Next, the LUT circuits 121–123 of FIG. 3 has the same hardware configuration, which is shown in more detail in FIG. 9. An LUT memory controller 177 is attached to an LUT memory 170 as in the configuration of FIG. 7. In this case, however, only one data flip-flop 171 for inputting one-dimensional color data (R, G, B) is provided on the data input side of the LUT memory 170, while only one data flip-flop 173 for outputting corrected color data is provided on the output side of the LUT memory 170. Otherwise, as in FIG. 7, data flip-flops 172, 174 for camera number data are present, while a bidirectional bus tranceiver buffer 176, bus buffers 178, 179 (one for color data and one for camera number) are provided as well. The basic operation is similar to that of FIG. 7 and so its detailed description is omitted.

Figure 11:
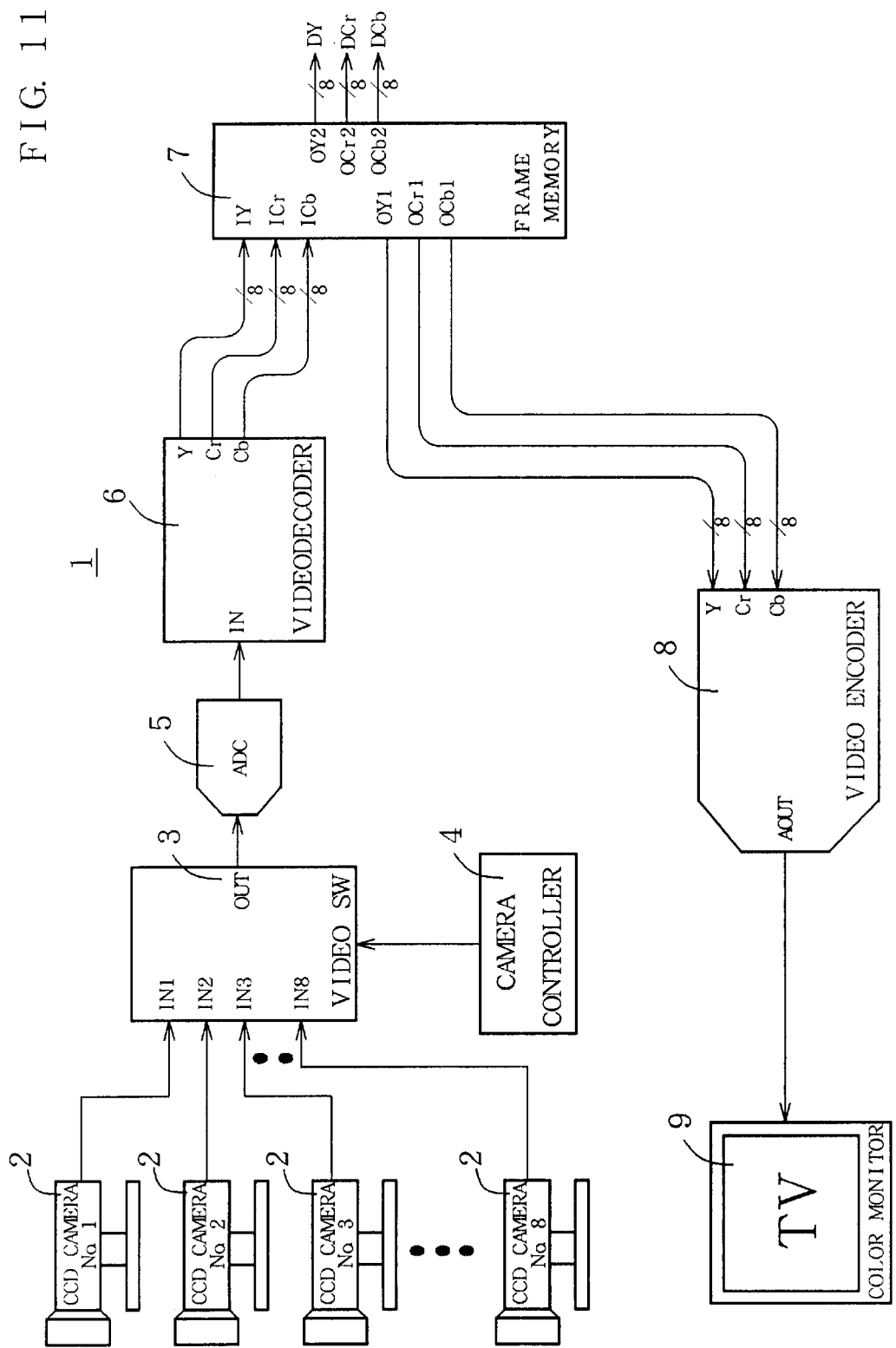
FIG. 11 is a block diagram showing one modification example of the image input/output mechanism.
Figure 12:
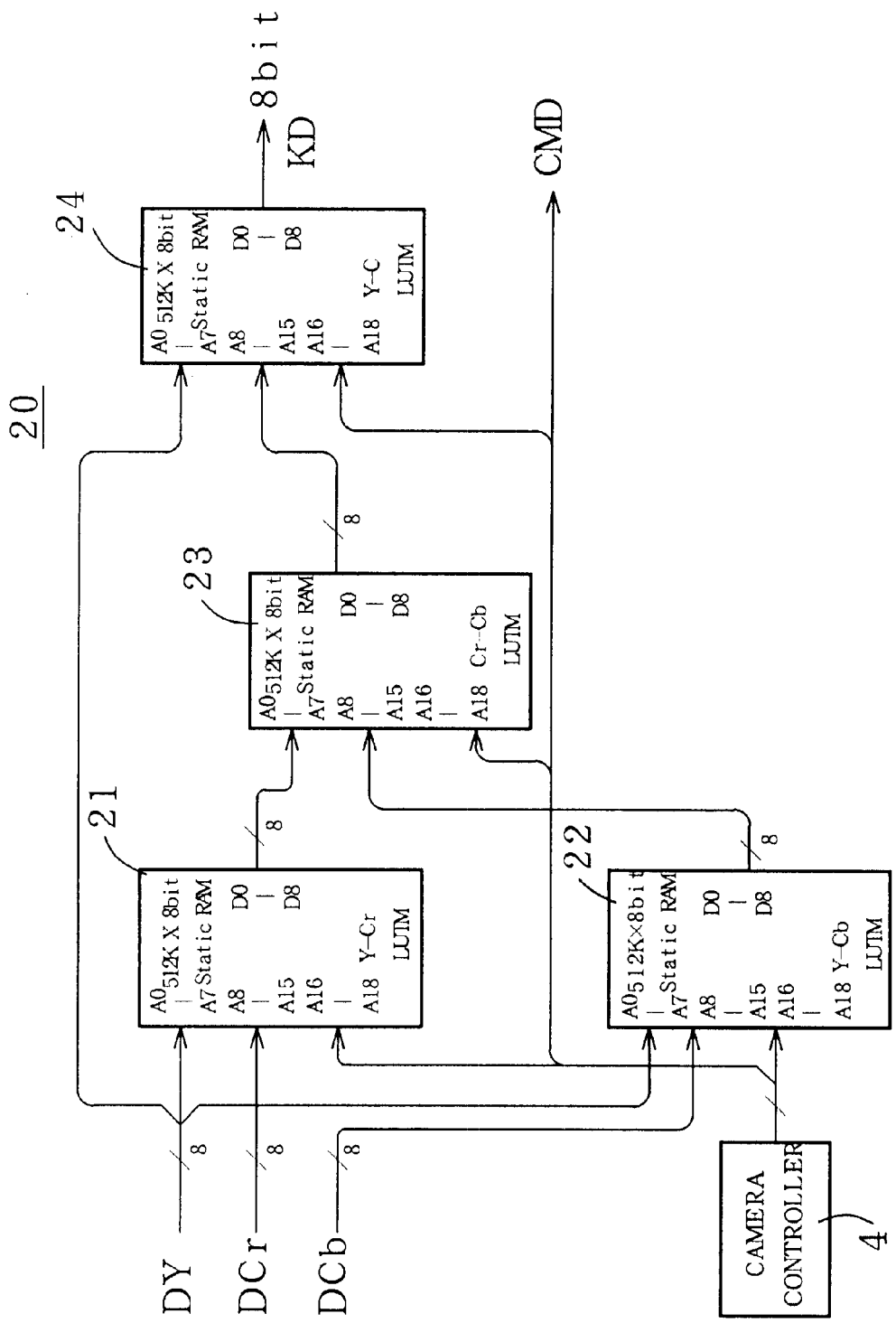
FIG. 12 is a block diagram showing one modification example of the color data extraction mechanism.
Figure 13:
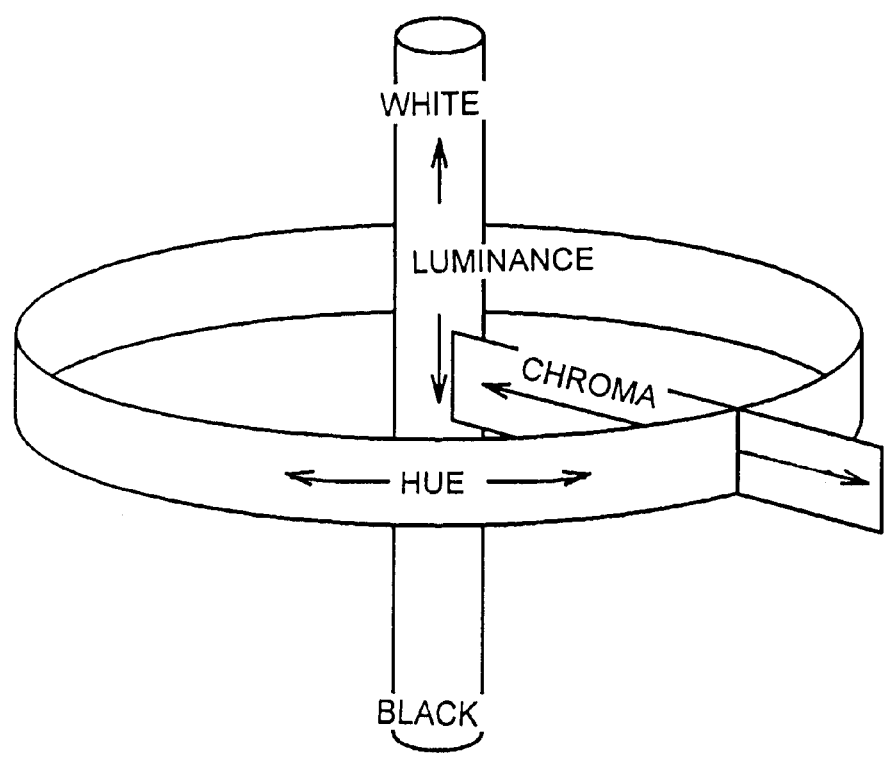
FIG. 13 is an explanatory view showing the relationship between luminance, hue and chroma.

FIGS. 11 and 12 show other configuration examples of the image input/output mechanism 1 and the color data extraction mechanism 20. In these cases, eight color cameras 2 are used. As shown in FIG. 11, an image signal of a selected color camera 2 is converted into a digital signal by an A/D converter 5 and thereafter, in this example, decoded into YCrCb, which is one form of representation in which luminance and color are separated from each other, by a video decoder (information separating means) 6. In the YCrCb image representation form, which is well known, so its detailed description being omitted, Y denotes a luminance signal and CrCb denotes a color space which constitutes a two-dimensional coordinate system and represents hue and chroma. As shown in FIG. 13, it can generally be said that a radius of a circle perpendicular to the coordinate system of luminance Y corresponds to the chroma, and that angular data from a certain reference phase corresponds to hue. Therefore, both data of Crcb give chromatic information those chroma and hue are defined. In addition, other than the YCrCb representation form, a YUV representation form may be used. This form represents chromatic information by the coordinate system of UV corresponding to luminance information Y and chroma/hue. In either case, the image signal is separated into luminance and chromatic information by the video decoder 6 with a known representation form (YCrCb representation form in this case) in which luminance and color are separated from each other, and the resulting data YCrCb are stored in the image memory (frame memory) 7.

The 8-bit luminance signal DY and color signals DCr, DCb outputted from the image memory 7 of FIG. 11 are fed to the color data extraction mechanism 20 shown in FIG. 12. In this case, the feed destinations are a Y-Cr LUT circuit 21, a Y-Cb LUT circuit 22, a Cr-Cb LUT cirtuit 23, a Y-C LUT circuit 24 and the like. An arithmetic unit using LUT circuits is, as well known, by the method that calculation results for all input data for memory are previously registered in the memory and the registered data are selectively outputted by using the address line for data input in a dictionary-like manner.

The flow of data processing can be outlined as follows. The LUT circuits (correction look-up table memories) 21, 22 subject color data to correction according to a luminance signal, and the image data are divided and integrated into a limited number of color groups by the LUT circuit 23 (color-integration look-up table memory) and the LUT circuit 24 (correction look-up table memory), so as to be 8-bit, 256 kinds of color groups. In this connection, referring to image data Y, Cr, Cb inputted from the image input/output mechanism 1 of FIG. 1, D denotes data and, as described before, Y denotes luminance, and Cr and Cb show a two-dimensional color space (hue/chroma space).

Three-bit signals from the camera controller 4 are fed to the LUT circuits 21–24 as 3-bit data of A16–A18. First, Cr data as well as Y data that is the luminance component, and camera number are inputted to the Y-Cr LUT circuit 21 in the first stage, so that Cr data is corrected according to the luminance of each camera. Similarly, Cb data is corrected according to the Y data that is the luminance component also in the Y-Cb LUT circuit 22. By this correction, chromatic component data that are less affected by changes in the illumination conditions are outputted. For example, whereas any change in the aperture of the camera would cause a change in the luminance data, there may arise an error when chromatic data Cr. Cb are affected by the change in the luminance data in spite of unchanged color data itself as it is. Therefore, correction is performed so that the chromatic component data is not affected by the change in luminance data. The form of correction may be, for example, that chromatic component data CrCb is calculated as a function of Y data that is the luminance component, or that a correction value or correction factor corresponding to the data of luminance component Y is added.

A totally 16-bit signal of Y data and Cr data inputted to the Y-Cr LUT circuit 21 is fed as 8-bit signals, and a totally 16-bit signal of Y data and chromatic component Cb data inputted to the Y-Cb LUT circuit 22 is fed as 8- bit signals, respectively, to the Cr-Cb LUT circuit 23. That is, to the Cr-Cb LUT circuit 23, are inputted chromatic component Cr data corrected by the luminance component, and chromatic component Cb data corrected also by the luminance component, as a totally 16-bit signal, 8-bit each. Further, to this Cr-Cb LUT circuit 23, is also Inputted the camera number from the camera controller 4. In this case, data of the hue and chroma space are integrated (consolidated) into a plurality of kinds (8-bit) color groups for each camera, and further divided and integrated into color groups necessary for monitoring including the luminance in the Y-C LUT circuit 24, where results KD are outputted as 256 kinds of color group numbers in 9-bit representation. This KD is outputted to the marker pixel counting mechanism 40 of FIG. 5. The processing subsequent to this is similar to that already described.

With this circuit also, about 16710 thousands of color representations of a 24-bit (DY: 8 bt, DCr: 8 bit, DCb: 8 bit) input image are integrated and divided for each color camera, and outputted as 256 kinds of color group signals, by which the amount of information becomes about 1/160000, thus allowing simple, fast calculation to be achieved. In addition, the constitution in which five LUT circuits are combined as shown in FIG. 12 indeed has an advantage that the circuitry can be made up of inexpensive memories of relatively small capacity (8 bit etc.), but this is only one example. For example, these five LUT circuits may be implemented by one large-capacity LUT circuit. Further, without using such an LUT circuit, similar analysis and integration into color groups of image signals, calculation of $\Sigma x, \Sigma y$ and n, and other processes can also be achieved in the sequence programs of the host computer.

What is claimed is:

1. The motion data preparation system comprising: one or a plurality of color cameras for shooting motions of a subject in a state that color markers are attached to the subject or that part of the subject is determined as a color marker;

color-integrated image data generating means for, through a decoding process of color image signals based on image outputs from the color cameras, integrating and consolidating color information included in each of the image signals into a specific number of color groups, and thereby generating image data (hereinafter, referred to as color-integrated image data) having data pieces smaller in number than the color image signals;

marker specified-color extracting means for extracting data of pixels having a color previously specified as a color of the color marker (hereinafter, referred to as marker specified color) with respect to the generated color-integrated image data; and marker-position-data calculating and outputting means for calculating a color marker position of the shot subject based on the extracted marker specified-color pixel data and outputting, as motion data of the subject, marker position data obtained as a result of the calculation, further comprising:

information separating means for, through a process of decoding the color image signal, separating the color image signal into luminance information, which is information on luminance, and chromatic information, which is information on chromatic components; and chromatic information correcting means for correcting the chromatic information by the luminance information, wherein the color-integrated image data generating means generates the color-integrated image data by integrating and consolidating mainly the separated chromatic information into a specified number of color groups.

2. The motion data preparation system according to claim 1, further comprising:

image signal digital converting means for converting the color image signal into digital form; and image data generating means for generating image data of the subject by fetching the digitally converted color image signal in specified time intervals, wherein the information separating means separates chromatic information of pixels of the image data into luminance information comprising a single component, and chromatic information comprising two components of a first chromatic component and a second chromatic component, and the color-integrated image data generating means comprises:

a color-integration look-up table memory which has stored a correspondence relationship between combinations of first chromatic component information groups and second chromatic component information groups obtained by dividing the first chromatic component information and the second chromatic component information into a specified number of groups, respectively, and chromatic information after the integration (hereinafter, referred to as integrated chromatic information), wherein the color-integration image data generating means reads with respect to each pixel, the integrated chromatic information to which the first chromatic component and the second chromatic component of the pixel correspond, from the color-integration look-up table memory in a dictionary-like manner, and assigning the reading result as chromatic data of the pixel.

3. The motion data preparation system according to claim 2, wherein the chromatic information correcting means comprises a correction look-up table memory which has stored a correspondence relationship between combinations of integrated chromatic information groups and luminante information groups obtained by dividing the integrated chromatic information and the luminance information into a specified number of groups, respectively, and chromatic information after the luminance correction, wherein the chromatic information correcting means reads, with respect to each pixel, chromatic information after the luminance correction to which the integrated chromatic information and the luminance information of the pixel corresponds from the correction look-up table memory in a dictionary-like manner, as corrected color data of the pixel.

4. The motion data preparation system according to claim 2, wherein the chromatic information correcting means comprises first and second correction look-up table memories which have stored a correspondence relationship between combinations of integrated chromatic information groups and luminance information groups obtained by dividing the chromatic information and the luminance information into specified numbers of groups in correspondence to the first chromatic component and the second chromatic component, respectively, and chromatic information after the luminance correction, wherein the chromatic information correcting means reads, with respect to each pixel, chromatic information after the luminance correction to which chromatic information and luminance information of the pixel correspond, from their corresponding correction look-up table memories, respectively, in a dictionary-like manner, as corrected chromatic information of the pixel, and the color-integrated image data generating means uses the first chromatic information and the second chromatic information those after the luminance correction.

5. The motion data preparation system according to claim 1, further comprising:

image signal digital converting means for converting the color image signal into digital form; and image data generating means for generating image data of the subject by fetching the digitally converted color image signal in specified time intervals, wherein the marker-positioned-data calculating and outputting means performs calculation and output of color-marker position data based on the marker specified-color pixel data successively and synchronously with the transfer period of the image data.

6. The motion data preparation system according to claim 5, wherein the marker-position-data calculating and outputting means calculates and outputs, for each of image data, color-marker position data including a total sum $\Sigma x$ of horizontal coordinate components x and a total sum $\Sigma y$ of vertical coordinate components y of pixels included in the marker image area, and a number n of pixels in each area.

7. The motion data preparation system according to claim 5, wherein each of the look-up table memories designates read-object data specifying information, such as the first and second chromatic component information, the luminance information or the integrated chromatic information, by means of an address line, so that read-object data specified by the read-object data specifying information is read from the memory cell designated by the address in a dictionary-like manner, and the system further comprises read control means serving for making the process of reading the read-object data from the look-up table memory for each of image data carried out successively in synchronization with a transfer period of the pixels.

8. The motion data preparation system according to claim 1, wherein the color camera is provided in a plurality, and the system comprises a switch to which the plurality of color cameras are connected, and by which cameras with which the subject is shot are selected by switching a state of connection to the cameras.

9. The motion data preparation system comprising: one or a plurality of color cameras for shooting motions of a subject in a state that color markers are attached to the subject or that part of the subject is determined as a color marker;

color-integrated image data generating means for, through a decoding process of color image signals based on image outputs from the color cameras, integrating and consolidating color information included in each of the image signals into a specific number of color groups, and thereby generating image data (hereinafter, referred to as color-integrated image data) having data pieces smaller in number than the color image signals;

marker specified-color extracting means for extracting data of pixels having a color previously specified as a color of the color marker (hereinafter, referred to as marker specified color) with respect to the generated color-integrated image data; and marker-position-data calculating and outputting means for calculating a color marker position of the shot subject based on the extracted marker specified-color pixel data and outputting, as motion data of the subject, marker position data obtained as a result of the calculation; further comprising:

image signal digital converting means for converting the color image signal into digital form; and image data generating means for generating image data of the subject by fetching the digitally converted color image signal in specified time intervals, wherein the marker-positioned-data calculating and outputting means performs calculation and output of color-marker position data based on the marker specified-color pixel data successively and synchronously with the transfer period of the image data, wherein each of the look-up table memories designates read-object data specifying information, such as the first and second chromatic component information, the luminance information or the integrated chromatic information, by means of an address line, so that read-object data specified by the read-object data specifying information is read from the memory cell designated by the address in a dictionary-like manner, and the system further comprises read control means serving for making the process of reading the read-object data from the look-up table memory for each of image data carried out successively in synchronization with a transfer period of the pixels.

* * * * *